(12) United States Patent
Toihara et al.

(10) Patent No.: US 7,504,149 B2
(45) Date of Patent: Mar. 17, 2009

(54) HARD MULTILAYER COATING, AND HARD MULTILAYER COATED TOOL INCLUDING THE HARD MULTILAYER COATING

(75) Inventors: Takaomi Toihara, Toyokawa (JP); Masatoshi Sakurai, Toyokawa (JP); Yasuo Fukui, Toyokawa (JP); Masuo Saitoh, Toyokawa (JP)

(73) Assignee: OSG Corporation, Toyokawa-shi (JP)

( * ) Notice: Subject to any disclaimer, the term of this patent is extended or adjusted under 35 U.S.C. 154(b) by 275 days.

(21) Appl. No.: 11/434,832

(22) Filed: May 17, 2006

(65) Prior Publication Data

US 2006/0269789 A1 Nov. 30, 2006

(30) Foreign Application Priority Data

May 31, 2005 (JP) ............................. 2005-158491

(51) Int. Cl.
*B32B 9/00* (2006.01)
(52) U.S. Cl. ..................... 428/216; 428/336; 428/697; 428/698; 428/699
(58) Field of Classification Search ................. 428/216, 428/336, 697, 698, 699
See application file for complete search history.

(56) References Cited

U.S. PATENT DOCUMENTS

| 6,492,011 | B1 * | 12/2002 | Brandle et al. ............... 428/699 |
| 6,824,601 | B2 | 11/2004 | Yamamoto et al. |
| 7,056,602 | B2 * | 6/2006 | Horling et al. ............... 428/697 |
| 7,060,345 | B2 * | 6/2006 | Fukui et al. .................. 428/216 |

FOREIGN PATENT DOCUMENTS

| JP | B2 3370291 | 11/2002 |
| JP | A 2003-071610 | 3/2003 |

* cited by examiner

*Primary Examiner*—Archene Turner
(74) *Attorney, Agent, or Firm*—Oliff & Berridge, PLC

(57) ABSTRACT

A hard multilayer coating that is to be disposed on a body, including: (a) a first coating layer disposed to be held in contact with the body, the first coating layer consisting of $TiAlCrX_{1-a}N_a$ (wherein "X" represents carbon or oxygen, and "a" represents a mixed crystal ratio satisfying $0.5 \leq a \leq 1$); (b) a second coating layer disposed on the first coating layer, the second coating layer being provided by a mixture layer consisting of $TiAlCrX_{1-b}N_b$ (wherein "b" represents a mixed crystal ratio satisfying $0.5 \leq b \leq 1$) and $TiAl(SiC)X_{1-c}N_c$ (wherein "c" represents a mixed crystal ratio satisfying $0.5 \leq c \leq 1$), or provided by a multilayer including a first sublayer consisting of the $TiAlCrX_{1-b}N_b$ and a second sublayer consisting of the $TiAl(SiC)X_{1-c}N_c$, which are alternately superposed on each other; and (c) a third coating layer disposed on the second coating layer and constituting an outermost layer of the hard multilayer coating, the third coating layer consisting of $TiAl(SiC)X_{1-d}N_d$ (wherein "d" represents a mixed crystal ratio satisfying $0.5 \leq d \leq 1$).

10 Claims, 7 Drawing Sheets

FIG. 4

| SAMPLES | COATING COMPOSITION | THICKNESS (μm) | | | | THICKNESS RATIO 1:(2+3) | THICKNESS RATIO 2:3 | VR(mm) AFTER CUTTING 28m |
|---|---|---|---|---|---|---|---|---|
| | | 1st COATING LAYER | 2nd COATING LAYER | 3rd COATING LAYER | TOTAL | | | |
| EXAMPLE1 | TiAlCrN+TiAlCrN/TiAl(SiC)N MIXTURE LAYER+TiAl(SiC)N | 1.0 | 0.05 | 0.05 | 1.1 | 1:0.1 | 1:1.0 | 0.082 |
| EXAMPLE2 | TiAlCrN+TiAlCrN/TiAl(SiC)N MIXTURE LAYER+TiAl(SiC)N | 1.0 | 0.07 | 0.73 | 1.8 | 1:0.8 | 1:10.4 | 0.085 |
| EXAMPLE3 | TiAlCrN+TiAlCrN/TiAl(SiC)N MIXTURE LAYER+TiAl(SiC)N | 1.8 | 0.2 | 0.5 | 2.5 | 1:0.4 | 1:2.5 | 0.081 |
| EXAMPLE4 | TiAlCrN+TiAlCrN/TiAl(SiC)N MIXTURE LAYER+TiAl(SiC)N | 1.9 | 0.1 | 0.1 | 2.1 | 1:0.1 | 1:1.0 | 0.077 |
| EXAMPLE5 | TiAlCrN+TiAlCrN/TiAl(SiC)N MIXTURE LAYER+TiAl(SiC)N | 2.0 | 0.2 | 0.8 | 3.0 | 1:0.5 | 1:4.0 | 0.073 |
| EXAMPLE6 | TiAlCrN+TiAlCrN/TiAl(SiC)N MIXTURE LAYER+TiAl(SiC)N | 2.0 | 0.2 | 1.6 | 3.8 | 1:0.9 | 1:8.0 | 0.088 |
| EXAMPLE7 | TiAlCrN+TiAlCrN/TiAl(SiC)N MIXTURE LAYER+TiAl(SiC)N | 2.1 | 0.1 | 0.2 | 2.4 | 1:0.1 | 1:2.0 | 0.079 |
| EXAMPLE8 | TiAlCrN+TiAlCrN/TiAl(SiC)N MIXTURE LAYER+TiAl(SiC)N | 2.4 | 0.3 | 0.5 | 3.2 | 1:0.3 | 1:1.7 | 0.072 |
| EXAMPLE9 | TiAlCrN+TiAlCrN/TiAl(SiC)N MIXTURE LAYER+TiAl(SiC)N | 2.5 | 0.1 | 2.0 | 4.6 | 1:0.8 | 1:20.0 | 0.083 |
| EXAMPLE10 | TiAlCrN+TiAlCrN/TiAl(SiC)N MIXTURE LAYER+TiAl(SiC)N | 3.0 | 0.1 | 0.2 | 3.3 | 1:0.1 | 1:2.0 | 0.075 |
| EXAMPLE11 | TiAlCrN+TiAlCrN/TiAl(SiC)N MIXTURE LAYER+TiAl(SiC)N | 3.1 | 0.1 | 1.4 | 4.6 | 1:0.5 | 1:14.0 | 0.081 |
| EXAMPLE12 | TiAlCrN+TiAlCrN/TiAl(SiC)N MIXTURE LAYER+TiAl(SiC)N | 3.5 | 0.3 | 2.7 | 6.5 | 1:0.9 | 1:9.0 | 0.078 |
| EXAMPLE13 | TiAlCrN+TiAlCrN/TiAl(SiC)N MIXTURE LAYER+TiAl(SiC)N | 4.1 | 0.7 | 2.2 | 7.0 | 1:0.7 | 1:3.0 | 0.087 |
| EXAMPLE14 | TiAlCrN+TiAlCrN/TiAl(SiC)N MIXTURE LAYER+TiAl(SiC)N | 4.9 | 1.2 | 2.9 | 9.7 | 1:1.0 | 1:2.4 | 0.084 |
| EXAMPLE15 | TiAlCrN+TiAlCrC$_{0.5}$N$_{0.5}$/TiAl(SiC)C$_{0.5}$N$_{0.5}$ MIXTURE LAYER+TiAl(SiC)C$_{0.5}$N$_{0.5}$ | 1.9 | 0.1 | 1.2 | 3.2 | 1:0.7 | 1:12.0 | 0.089 |
| EXAMPLE16 | TiAlCrC$_{0.2}$N$_{0.8}$+TiAlCrN/TiAl(SiC)N MIXTURE LAYER+TiAl(SiC)N | 2.1 | 0.2 | 0.6 | 2.9 | 1:0.4 | 1:3.0 | 0.082 |
| EXAMPLE17 | TiAlCrC$_{0.1}$N$_{0.9}$+TiAlCrC$_{0.1}$N$_{0.9}$/TiAl(SiC)C$_{0.1}$N$_{0.9}$ MIXTURE LAYER+TiAl(SiC)N | 1.7 | 0.5 | 0.8 | 3.0 | 1:0.8 | 1:1.6 | 0.087 |
| EXAMPLE18 | TiAlCrN+TiAlCrC$_{0.4}$N$_{0.6}$/TiAl(SiC)C$_{0.4}$N$_{0.6}$ MIXTURE LAYER+TiAl(SiC)N | 2.2 | 0.4 | 0.5 | 3.1 | 1:0.4 | 1:1.3 | 0.081 |
| EXAMPLE19 | TiAlCrN+TiAlCrC$_{0.2}$N$_{0.8}$/TiAl(SiC)C$_{0.2}$N$_{0.8}$ MIXTURE LAYER+TiAl(SiC)C$_{0.2}$N$_{0.8}$ | 2.3 | 0.2 | 0.8 | 3.3 | 1:0.4 | 1:4.0 | 0.082 |
| EXAMPLE20 | TiAlCrN+TiAlCrN/TiAl(SiC)N MIXTURE LAYER+TiAl(SiC)C$_{0.5}$N$_{0.5}$ | 2.0 | 0.3 | 0.6 | 2.9 | 1:0.5 | 1:2.0 | 0.085 |
| EXAMPLE21 | TiAlCrO$_{0.5}$N$_{0.5}$+TiAlCrO$_{0.5}$N$_{0.5}$/TiAl(SiC)O$_{0.5}$N$_{0.5}$ MIXTURE LAYER+TiAl(SiC)O$_{0.5}$N$_{0.5}$ | 2.1 | 0.1 | 1.1 | 3.3 | 1:0.6 | 1:11.0 | 0.088 |
| EXAMPLE22 | TiAlCrO$_{0.3}$N$_{0.7}$+TiAlCrN/TiAl(SiC)N MIXTURE LAYER+TiAl(SiC)N | 1.9 | 0.2 | 1.2 | 3.3 | 1:0.7 | 1:6.0 | 0.087 |
| EXAMPLE23 | TiAlCrO$_{0.4}$N$_{0.6}$+TiAlCrO$_{0.4}$N$_{0.6}$/TiAl(SiC)O$_{0.4}$N$_{0.6}$ MIXTURE LAYER+TiAl(SiC)N | 2.2 | 0.3 | 0.3 | 2.8 | 1:0.3 | 1:1.0 | 0.081 |
| EXAMPLE24 | TiAlCrO$_{0.2}$N$_{0.8}$+TiAlCrO$_{0.2}$N$_{0.8}$/TiAl(SiC)O$_{0.2}$N$_{0.8}$ MIXTURE LAYER+TiAl(SiC)N | 2.4 | 0.2 | 0.3 | 2.9 | 1:0.2 | 1:1.5 | 0.089 |
| EXAMPLE25 | TiAlCrO$_{0.1}$N$_{0.9}$+TiAlCrO$_{0.1}$N$_{0.9}$/TiAl(SiC)O$_{0.1}$N$_{0.9}$ MIXTURE LAYER+TiAl(SiC)O$_{0.1}$N$_{0.9}$ | 1.8 | 0.1 | 1.0 | 2.9 | 1:0.6 | 1:10.0 | 0.086 |
| EXAMPLE26 | TiAlCrN+TiAlCrN/TiAl(SiC)N MIXTURE LAYER+TiAl(SiC)O$_{0.3}$N$_{0.7}$ | 2.3 | 0.3 | 0.7 | 3.3 | 1:0.4 | 1:2.3 | 0.084 |

FIG.5

| SAMPLES | COATING COMPOSITION | THICKNESS(μm) | | | | 1:(2+3) THICKNESS RATIO | 2:3 THICKNESS RATIO | VB(mm) AFTER CUTTING 28m |
| --- | --- | --- | --- | --- | --- | --- | --- | --- |
| | | 1st COATING LAYER | 2nd COATING LAYER | 3rd COATING LAYER | TOTAL | | | |
| EXAMPLE27 | TiAlCrN+TiAlCrN/TiAl(SiC)N MIXTURE LAYER+TiAl(SiC)N | 0.7 | 0.3 | 0.4 | 1.4 | 1 : 1.0 | 1 : 1.3 | 0.112 |
| EXAMPLE28 | TiAlCrN+TiAlCrN/TiAl(SiC)N MIXTURE LAYER+TiAl(SiC)N | 0.8 | 0.3 | 0.2 | 1.3 | 1 : 0.6 | 1 : 0.7 | 0.109 |
| EXAMPLE29 | TiAlCrN+TiAlCrN/TiAl(SiC)N MIXTURE LAYER+TiAl(SiC)N | 0.8 | 0.2 | 0.2 | 1.2 | 1 : 0.9 | 1 : 1.0 | 0.107 |
| EXAMPLE30 | TiAlCrN+TiAlCrN/TiAl(SiC)N MIXTURE LAYER+TiAl(SiC)N | 2.1 | 0.1 | 2.3 | 4.5 | 1 : 1.1 | 1 : 23.0 | 0.108 |
| EXAMPLE31 | TiAlCrN+TiAlCrN/TiAl(SiC)N MIXTURE LAYER+TiAl(SiC)N | 2.5 | 0.1 | 0.1 | 2.7 | 1 : 0.08 | 1 : 1.0 | 0.105 |
| EXAMPLE32 | TiAlCrN+TiAlCrN/TiAl(SiC)N MIXTURE LAYER+TiAl(SiC)N | 5.2 | 0.2 | 1.4 | 6.8 | 1 : 0.3 | 1 : 7.0 | 0.114 |
| EXAMPLE33 | TiAlCrN+TiAlCrN/TiAl(SiC)N MIXTURE LAYER+TiAl(SiC)N | 5.2 | 0.5 | 4.7 | 10.4 | 1 : 1.0 | 1 : 9.4 | 0.104 |

FIG.6

| SAMPLES | COATING COMPOSITION | THICKNESS(μm) | | | | 1:(2+3) THICKNESS RATIO | VB(mm) AFTER CUTTING 28m |
|---|---|---|---|---|---|---|---|
| | | 1st COATING LAYER | 2nd COATING LAYER | 3rd COATING LAYER | TOTAL | | |
| COMPARATIVE EXAMPLE1 | TiAlCrN+TiAlCr-CN/TiAl(SiC)CN MIXTURE LAYER | 2.1 | 1.1 | | 3.2 | 1 : 0.5 | 0.105 |
| COMPARATIVE EXAMPLE2 | TiAlCrN+TiAlCr-CN/TiAl(SiC)CN MIXTURE LAYER+TiAlCrN | 2.4 | 0.2 | 1.0 | 3.6 | 1 : 0.5 | 0.109 |
| COMPARATIVE EXAMPLE3 | TiAlN SINGLE LAYER | | | | 1.2 | – | 0.392 |
| COMPARATIVE EXAMPLE4 | TiAlN SINGLE LAYER | | | | 2.2 | – | 0.351 |
| COMPARATIVE EXAMPLE5 | TiAlN SINGLE LAYER | | | | 3.1 | – | 0.344 |
| COMPARATIVE EXAMPLE6 | TiAlN SINGLE LAYER | | | | 4.8 | – | 0.354 |
| COMPARATIVE EXAMPLE7 | TiAlN SINGLE LAYER | | | | 9.8 | – | 0.359 |
| COMPARATIVE EXAMPLE8 | TiAl(SiC)N SINGLE LAYER | | | | 1.1 | – | 0.381 |
| COMPARATIVE EXAMPLE9 | TiAl(SiC)N SINGLE LAYER | | | | 2.4 | – | 0.221 |
| COMPARATIVE EXAMPLE10 | TiAl(SiC)N SINGLE LAYER | | | | 4.9 | – | 0.218 |
| COMPARATIVE EXAMPLE11 | TiAl(SiC)N SINGLE LAYER | | | | 9.9 | – | 0.235 |
| COMPARATIVE EXAMPLE12 | TiAlCrN SINGLE LAYER | | | | 1.2 | – | 0.193 |
| COMPARATIVE EXAMPLE13 | TiAlCrN SINGLE LAYER | | | | 2.5 | – | 0.167 |
| COMPARATIVE EXAMPLE14 | TiAlCrN SINGLE LAYER | | | | 3.2 | – | 0.158 |
| COMPARATIVE EXAMPLE15 | TiAlCrN SINGLE LAYER | | | | 4.8 | – | 0.155 |
| COMPARATIVE EXAMPLE16 | TiAlCrN SINGLE LAYER | | | | 9.7 | – | 0.176 |

FIG.7

| COATING | COATING HARDNESS (HV0.025) | OXIDATION INITIATION TEMPERATURE (°C) |
|---|---|---|
| TiAlCrN | 3500 | 900 |
| TiAl(SiC)N | 3000 | 1100 |
| TiAlN | 2800 | 800 |

HARD MULTILAYER COATING, AND HARD MULTILAYER COATED TOOL INCLUDING THE HARD MULTILAYER COATING

This application is based on Japanese Patent Application No. 2005-158491 filed on May 31, 2005, the content of which is incorporated hereinto by reference.

BACKGROUND OF THE INVENTION

1. Field of the Invention

The present invention relates in general to a hard multilayer coating, and more particularly to such a hard multilayer coating that is excellent in its heat resistance and wear resistance.

2. Discussion of the Related Art

There is widely used TiAlN as a hard coating that is disposed on a surface of a body such as a tool substrate made of high-speed tool steel, cemented carbide or other material. In recent years, as disclosed in JP-2003-71610A and JP-2000-308906A (publications of unexamined Japanese Patent Applications laid open in 2003 and 2000), there are proposed TiAlCrN and TiAl(SiC)N as the hard coating for such a use.

Each of TiAlCrN and TiAl(SiC)N has a coating hardness and an oxidation initiation temperature that are higher than those of TiAlN, as shown in FIG. 7, and accordingly is excellent in its heat resistance and wear resistance. However, the oxidation initiation temperature of TiAlCrN is about 900° C., and is lower than that of TiAl(SiC)N. The coating hardness (HV0.025) of TiAl(SiC)N is about 3000, and is lower than that of TiAlCrN. That is, the hard coating still has a room to be improved, particularly, in view of the use as a coating provided to cover a substrate of a tool intended for machining a high hardness material at a high speed.

SUMMARY OF THE INVENTION

The present invention was made in view of the background prior art discussed above. It is therefore a first object of the present invention to provide a hard multilayer coating having further improved heat resistance and wear resistance. This first object may be achieved according to any one of first through fourth aspects of the invention that are described below. It is a second object of the invention to provide a hard multilayer coated tool which includes the hard multilayer coating having the further improved heat resistance and wear resistance. This second object may be achieved according to fifth aspect of the invention which is described below.

The first aspect of this invention provides a hard multilayer coating that is to be disposed on a body, comprising: (a) a first coating layer disposed to be held in contact with the body, the first coating layer essentially consisting of $TiAlCrX_{1-a}N_a$ (wherein "X" represents one of carbon and oxygen, and "a" represents a mixed crystal ratio satisfying $0.5 \leq a \leq 1$); (b) a second coating layer disposed on the first coating layer, the second coating layer being provided by a mixture layer essentially consisting of $TiAlCrX_{1-b}N_b$ (wherein "X" represents the one of carbon and oxygen, and "b" represents a mixed crystal ratio satisfying $0.5 \leq b \leq 1$) and $TiAl(SiC)X_{1-c}N_c$ (wherein "X" represents the one of carbon and oxygen, and "c" represents a mixed crystal ratio satisfying $0.5 \leq c \leq 1$), or provided by a multilayer including a first sublayer essentially consisting of the $TiAlCrX_{1-b}N_b$ and a second sublayer essentially consisting of the $TiAl(SiC)X_{1-c}N_c$, the first and second sublayers being alternately superposed on each other; and (c) a third coating layer disposed on the second coating layer and constituting an uppermost or outermost layer of the hard multilayer coating, the third coating layer essentially consisting of $TiAl(SiC)X_{1-d}N_d$ (wherein "X" represents the one of carbon and oxygen, and "d" represents a mixed crystal ratio satisfying $0.5 \leq d \leq 1$).

According to the second aspect of the invention, in the hard multilayer coating defined in the first aspect of the invention, the first coating layer has a thickness of from 1.0 μm to 5.0 μm, wherein a ratio of a sum of thicknesses of the second and third coating layers to the thickness of the first coating layer is from 0.1 to 1.0, and wherein a total of thicknesses of the first, second and third coating layers is from 1.1 μm to 10 μm.

According to the third aspect of the invention, in the hard multilayer coating defined in the second aspect of the invention, a ratio of the thickness of the third coating layer to the thickness of the second coating layer is from 1.0 to 20.

According to the fourth aspect of the invention, in the hard multilayer coating defined in any one the first through third aspects of the invention, the mixed crystal ratios a, b, c, d are all the same to each other.

The fifth aspect of the invention provides a hard multilayer coated tool comprising: the hard multilayer coating defined in any one of the first through fourth aspects of the invention; and a substrate having a surface coated with the hard multilayer coating.

In the hard multilayer coating defined in any one of the first through fourths aspect of the invention, the $TiAl(SiC)X_{1-d}N_d$ constituting the uppermost or outermost third coating layer is excellent in its heat resistance owing to its oxidation initiation temperature that is sufficiently high, the $TiAlCrX_{1-a}N_a$ constituting the first coating layer has a coating hardness that is sufficiently high, and the second coating layer provided by the mixture layer or by the multilayer contains substantially the same components as the first and third coating layers is disposed between the first and third coating layers. This construction provides a high degree of adhesiveness among the first through third coating layers, so that the first through third coating layers as a whole is provided with excellent heat resistance and wear resistance. Therefore, the hard multilayer coated tool of the fifth aspect of the invention having the substrate covered at its surface with such a hard multilayer coating is capable of cutting or machining a high hardness material at a high speed, owing to the improved heat resistance and wear resistance.

In the hard multilayer coating defined in the second aspect of the invention, the thickness of the first coating layer is not smaller than 1.0 μm and not larger than 5.0 μm, the ratio of the sum of thicknesses of the second and third coating layers to the thickness of the first coating layer is not smaller than 0.1 and not larger than 1.0, and the total of thicknesses of the first, second and third coating layers is not smaller than 1.1 μm and not larger than 10 μm. In this arrangement, deformation of the coating as a whole is restrained owing to presence of the first coating layer having a relatively high degree of hardness, and chipping and peeling of the coating is satisfactorily prevented owing to further increased adhesiveness of the third coating layer.

In the hard multilayer coating defined in the third aspect of the invention, the ratio of the thickness of the third coating layer to the thickness of the second coating layer is from 1.0 to 20. Thus, since the thickness of the third coating layer is relatively large, the hard multilayer coating as a whole is given the heat resistance which is increased by the presence of the third coating layer.

In the hard multilayer coating defined in the fourth aspect of the invention, the mixed crystal ratios a, b, c, d are all the same to each other. This arrangement, for example, where the hard multilayer coating is formed by an arc ion plating method, eliminates necessity of switching a reaction gas or the like during the formation of the coating, thereby facilitating the manufacturing of the coating, and making it possible to reliably obtain the coating with the predetermined mixed crystal ratios.

The present invention may be advantageously applied to a hard multilayer coating to be provided to cover a substrate of any machining tool, which is to be moved relative to a workpiece for thereby machining the workpiece, such as a rotary cutting tool (e.g., end mill, drill, tap and threading die), a non-rotary cutting tool (e.g., replaceable insert which is fixed to a tool holder used for a lathe operation) and a cold-forming tool which is designed to form a workpiece into a desired shape by plastically deforming the workpiece. In addition, the present invention may be applied also to a hard multilayer coating to be provided as a surface-protecting coating to cover a body or member which is other than such machining tools. It is noted that the substrate of the machining tool, which is to be coated with the hard multilayer coating, is preferably made of a cemented carbide or a high-speed tool steel. However, the tool substrate may be made of any other metallic material.

As a method of forming the hard multilayer coating according to the present invention, an arc ion plating method is advantageously employed. However, it is possible to employ other physical vapor deposition (PVD) method such as a sputtering method, or alternatively, a chemical vapor deposition (CVD) method such as a plasma CVD method and a thermal CVD method.

The $X_{1-a}N_a$ of the first coating layer (wherein "X" represents one of carbon (C) and oxygen (O), and "a" represents a mixed crystal ratio satisfying $0.5 \leq a \leq 1$) is nitride where $a=1$, and is oxide nitride or carbon nitride where $0.5 \leq a < 1$. The same may be said of the $X_{1-b}N_b$, $X_{1-c}N_c$ of the second coating layer and the $X_{1-d}N_d$ of the third coating layer. The mixed crystal ratios a, b, c, d may be all the same to each other, as in the fourth aspect of the invention. However, the mixed crystal ratios a, b, c, d may be different from each other, for example, by alternatively allowing and inhibiting introduction of the reaction gas of the component X during the formation of the hard multilayer coating. Further, the component X may contain, in addition to the carbon (C) or oxygen (O), other element such as inevitable impurity element which does not affect the property of each coating layer.

The second coating layer may be provided by the mixture layer essentially consisting of the $TiAlCrX_{1-b}N_b$ and $TiAl(SiC)X_{1-c}N_c$, or alternatively the multilayer including the first sublayer essentially consisting of the $TiAlCrX_{1-b}N_b$ and the second sublayer essentially consisting of the $TiAl(SiC)X_{1-c}N_c$, which are alternately superposed on each other. The compositions of the $TiAlCrX_{1-b}N_b$ and $TiAl(SiC)X_{1-c}N_c$ of the second coating layer may be identical with the compositions of the $TiAlCrX_{1-a}N_a$ of the first coating layer and the $TiAl(SiC)X_{1-d}N_d$ of the third coating layer, respectively ($a=b$, $c=d$). However, the compositions of the $TiAlCrX_{1-b}N_b$ and $TiAl(SiC)X_{1-c}N_c$ of the second coating layer may be different from the compositions of the $TiAlCrX_{1-a}N_a$ of the first coating layer and the $TiAl(SiC)X_{1-d}N_d$ of the third coating layer ($a \neq b$, $c \neq d$).

Where the second coating layer is provided by the mixture layer, a mixing ratio between the $TiAlCrX_{1-b}N_b$ and $TiAl(SiC)X_{1-c}N_c$ may be suitably determined, for example, such that the mixing ratio therebetween is 1:1. Further, the mixture layer may be constructed with the mixing ratio being changed continuously or stepwise. The mixing ratio may be changed, for example, such that a ratio of the $TiAlCrX_{1-b}N_b$ to the $TiAl(SiC)X_{1-c}N_c$ is higher in an upper portion of the second coating layer than in a lower portion of the second coating layer. In the mixture layer, $X_{1-b}N_b$ is identical with $X_{1-c}N_c$ ($X_{1-b}N_b = X_{1-c}N_c$), so that the mixed crystal ratios b, c are equal to each other.

Where the second coating layer is provided by the multilayer including the first sublayer ($TiAlCrX_{1-b}N_b$) and second sublayers ($TiAl(SiC)X_{1-c}N_c$) which are alternately superposed on each other, a ratio between a thickness of the first sublayer and a thickness of the second sublayer is suitably determined, for example, such that the mixing ratio therebetween is 1:1. Further, the multilayer may be constructed with the thickness ratio being changed continuously or stepwise. The thickness ratio may be changed, for example, such that a ratio of the thickness of $TiAl(SiC)X_{1-c}N_c$ to the thickness of $TiAlCrX_{1-b}N_b$ is higher in an upper portion of the second coating layer than in a lower portion of the second coating layer.

In the hard multilayer coating defined in the second aspect of the invention, the thickness of the first coating layer is not smaller than 1.0 μm and not larger than 5.0 μm, the ratio of the sum of thicknesses of the second and third coating layers to the thickness of the first coating layer is not smaller than 0.1 and not larger than 1.0, and the total of thicknesses of the first, second and third coating layers is not smaller than 1.1 μm and not larger than 10 μm. In the hard multilayer coating defined in the third aspect of the invention, the ratio of the thickness of the third coating layer to the thickness of the second coating layer is from 1.0 to 20. However, the first aspect of the invention may be carried out without satisfaction of these conditions regarding the thickness of each of the first through third coating layers. That is, even without the above-described conditions being satisfied, the first aspect of the invention provides the hard multilayer coating which exhibits higher degrees of heat resistance and wear resistance than a conventional monolayer (single layer) essentially consisting of TiAlCrN and TiAl(SiC)N. The hard multilayer coated tool including the substrate coated with such a hard multilayer coating is capable of cutting or machining a high hardness material at a high speed, owing to the improved heat resistance and wear resistance.

If the thickness of the first coating layer is smaller than 1.0 μm, the hard multilayer coating would not have a sufficient degree of wear resistance. If the thickness of the first coating layer is larger than 5.0 μm, the tenacity (unbrittleness) would be reduced whereby the chipping or peeling could be easily caused. If the ratio of the sum of thicknesses of the second and third coating layers to the thickness of the first coating layer is smaller than 0.1, the hard multilayer coating would not have a sufficient degree of heat resistance. If the ratio of the sum of thicknesses of the second and third coating layers to the thickness of the first coating layer is larger than 1.0, the coating hardness would be reduced whereby the wear resistance could be deteriorated. Further, if the ratio of the thickness of the third coating layer to the thickness of the second coating layer is smaller than 1.0, the hard multilayer coating would not have a sufficient degree of heat resistance. If the ratio of the thickness of the third coating layer to the thickness of the second coating layer is larger than 20, the coating hardness would be reduced whereby the wear resistance could be deteriorated. The characteristics of the hard multilayer coating are changed, for example, depending on the composition of the second coating layer, e.g., the mixing ratio between the $TiAlCrX_{1-b}N_b$ and $TiAl(SiC)X_{1-c}N_c$.

BRIEF DESCRIPTION OF THE DRAWINGS

The above and other objects, features, advantages and technical and industrial significance of this invention will be better understood by reading the following detailed description of the presently preferred embodiment of the invention, when considered in connection with the accompanying drawings, in which:

FIG. 4 is a table showing various examples of the hard multilayer coating constructed according to the invention, and indicating results of tests that are conducted to the respective examples for checking wear resistance of each of the examples;

FIG. 5 is a table showing other examples of the hard multilayer coating constructed according to the invention, and indicating results of tests that are conducted to the respective examples for checking wear resistance of each of the examples;

FIG. 6 is a table showing comparative examples of a hard multilayer coating, as compared with the examples of FIGS. 4 and 5, and indicating results of tests that are conducted to the respective comparative examples for checking wear resistance of each of the comparative examples; and FIG. 7 is a table showing coating characteristics of TiAlCrN, TiAl(SiC)N and TiAlN.

DETAILED DESCRIPTION OF THE PREFERRED EMBODIMENT

Figure 1A:
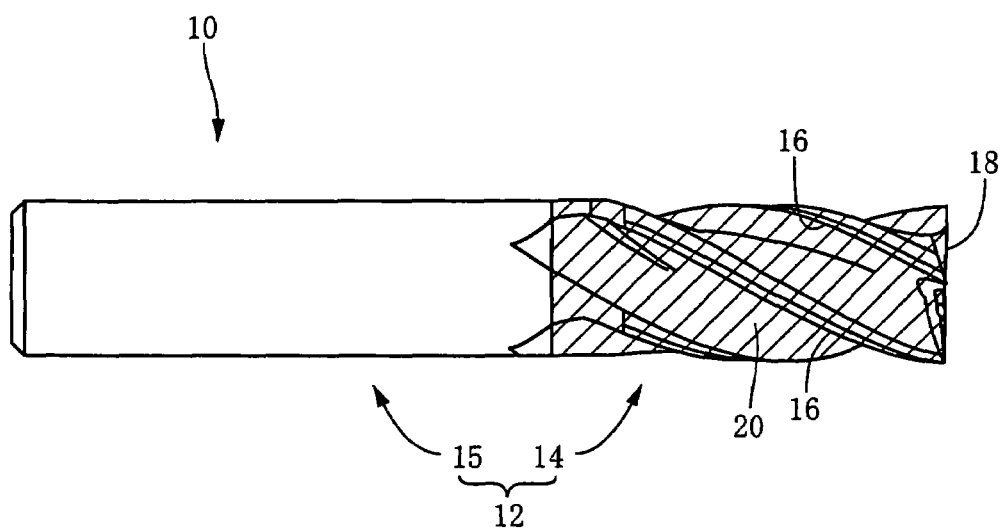
FIG. 1A is an elevational view of a hard multilayer coated tool in the form of an end mill which is constructed according to an embodiment of the present invention.

FIG. 1A is an elevational view of a hard multilayer coated tool in the form of an end mill 10 which is constructed according to an embodiment of the invention. The end mill 10 includes a tool substrate (body) 12 having a generally cylindrical shape and formed of a cemented carbide. The tool substrate 12 has a cutting teeth portion 14 and a shank portion 15 which are formed integrally with each other. The cutting teeth portion 14, in which helical flutes and cutting teeth are formed, has a surface that is coated with a hard multilayer coating 20. In FIG. 1A, the oblique-lined portion represents a portion of the surface on which the hard multilayer coating 20 is coated. Each of the cutting teeth has a peripheral flank face, a bottom or end flank face and a rake face which is provided by the corresponding one of the helical flutes, so that a peripheral cutting edge 16 and a bottom or end cutting edge 18 are formed in each cutting tooth. The peripheral cutting edge 16 is defined by an intersection of the rake face and the peripheral flank face, while the end cutting edge 18 is defined by an intersection of the rake face and the end flank face. In a cutting operation with this end mill 10, the end mill 10 is rotated about its axis whereby a workpiece is cut by the cutting edges 16, 18.

Figure 1B:
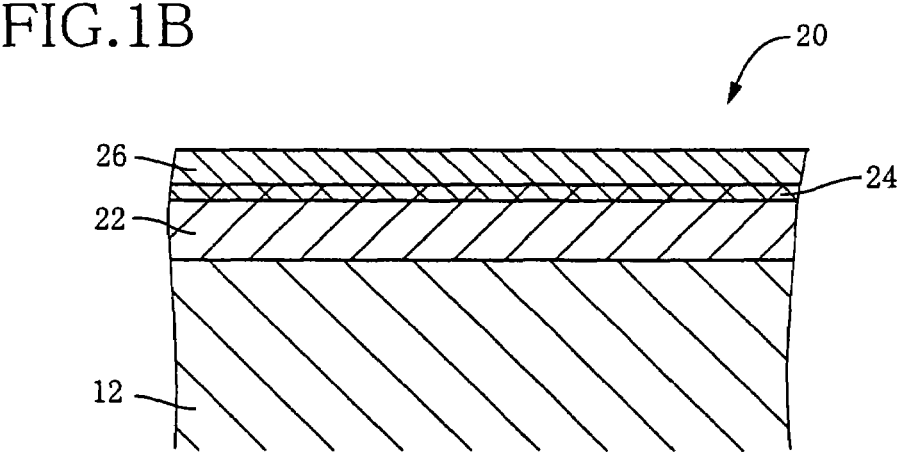
FIG. 1B is a cross sectional view of a cutting teeth portion of the end mill of FIG. 1A, showing a hard multilayer coating which is disposed on the a substrate of the end mill.

As is apparent from FIG. 1B which is a cross sectional view of the cutting teeth portion 14 coated with the hard multilayer coating 20, the hard multilayer coating 20 consists of a first coating layer 22, a second coating layer 24 and a third coating layer 26 which are superposed on each other on a surface of the tool substrate 12 in this order of description. The first coating layer 22 essentially consists of TiAlCrX$_{1-a}$N$_a$ (wherein "X" represents carbon or oxygen, and "a" represents a mixed crystal ratio satisfying $0.5 \leq a \leq 1$), and is disposed to be held in contact with an outer surface of the tool substrate 12. The second coating layer 24 is provided by a mixture layer essentially consisting of TiAlCrX$_{1-b}$N$_b$ (wherein "b" represents a mixed crystal ratio satisfying $0.5 \leq b \leq 1$) and TiAl(SiC)X$_{1-c}$N$_c$ (wherein "c" represents a mixed crystal ratio satisfying $0.5 \leq c \leq 1$), or provided by a multilayer including a first sublayer essentially consisting of the TiAlCrX$_{1-b}$N$_b$ and a second sublayer essentially consisting of the TiAl(SiC)X$_{1-c}$N$_c$ such that the first and second sublayers are alternately superposed on each other. Where the second coating layer 24 is provided by the mixture layer, the mixed crystal ratios b, c are equal to each other. The third coating layer 26 essentially consists of TiAl(SiC)X$_{1-d}$N$_d$ (wherein "d" represents a mixed crystal ratio satisfying $0.5 \leq d \leq 1$), and constitutes an uppermost or outermost layer of the hard multilayer coating 20.

Although each of the mixed crystal ratios a, b, c, d may be suitably set within a range of from 0.5 to 1, the mixed crystal ratios a, b, c, d may be set to be equal to each other. In Examples 1-14 of FIG. 4 and examples 27-33 of FIG. 5, each of the mixed crystal ratios a, b, c, d is 1.0, so that each of the first, second and third coating layers 22, 24, 26 is nitride not including oxygen and carbon. In Example 15 of FIG. 4, each of the mixed crystal ratios a, b, c, d is 0.5, so that each of the first, second and third coating layers 22, 24, 26 is carbon nitride including carbon as the component X. In Example 16 of FIG. 4, the mixed crystal ratio a is 0.8 so that the first coating layer 22 is carbon nitride including carbon as the component X, while each of the mixed crystal ratios b, c, d is 1.0 so that each of the second and third coating layers 24, 26 is nitride consisting of only nitrogen. In Example 17 of FIG. 4, each of the mixed crystal ratios a, b, c is 0.9 so that each of the first and second coating layers 22, 24 is carbon nitride including carbon as the component X, while the mixed crystal ratio d is 1.0 so that the third coating layer 26 is nitride consisting of only nitrogen. In Example 18 of FIG. 4, each of the mixed crystal ratios b and c is 0.6 so that the second coating layer 24 is carbon nitride including carbon as the component X, while each of the mixed crystal ratios a, d is 1.0 so that each of the first and third coating layers 22, 26 is nitride consisting of only nitrogen. In Example 19 of FIG. 4, each of the mixed crystal ratios b, c, d is 0.8 so that each of the second and third coating layers 24, 26 is carbon nitride including carbon as the component X, while the mixed crystal ratio a is 1.0 so that the first coating layer 22 is nitride consisting of only nitrogen. In Example 20 of FIG. 4, the mixed crystal ratio d is 0.5 so that the third coating layer 26 is carbon nitride including carbon as the component X, while each of the mixed crystal ratios a, b, c is 1.0 so that each of the first and second coating layers 22, 24 is nitride consisting of only nitrogen.

In Example 21 of FIG. 4, each of the mixed crystal ratios a, b, c, d is 0.5, so that each of the first, second and third coating layers 22, 24, 26 is oxide nitride including oxygen as the component X. In Example 22 of FIG. 4, the mixed crystal ratio a is 0.7 so that the first coating layer 22 is oxide nitride including oxygen as the component X, while each of the mixed crystal ratios b, c, d is 1.0 so that each of the second and third coating layers 24, 26 is nitride consisting of only nitrogen. In Example 23 of FIG. 4, each of the mixed crystal ratios a, b, c is 0.6 so that each of the first and second coating layers 22, 24 is oxide nitride including oxygen as the component X, while the mixed crystal ratio d is 1.0 so that the third coating layer 26 is nitride consisting of only nitrogen. In Example 24 of FIG. 4, each of the mixed crystal ratios b and c is 0.8 so that the second coating layer 24 is oxide nitride including oxygen as the component X, while each of the mixed crystal ratios a, d is 1.0 so that each of the first and third coating layers 22, 26 is nitride consisting of only nitrogen. In Example 25 of FIG. 4, each of the mixed crystal ratios b, c, d is 0.9 so that the second and third coating layers 24, 26 is oxide nitride including oxygen as the component X, while the mixed crystal ratio a is 1.0 so that the first coating layer 22 is nitride consisting of only nitrogen. In Example 26 of FIG. 4, the mixed crystal ratio d is 0.7 so that the third coating layer 26 is oxide nitride including oxygen as the component X, while each of the mixed crystal ratios a, b, c is 1.0 so that each of the first and second coating layers 22, 24 is nitride consisting of only nitrogen.

The thickness of the first coating layer 22 is preferably within a range of from 1.0 μm to 5.0 μm. The ratio between the thickness of the first coating layer 22 and the sum of thicknesses of the second and third coating layers 24, 26 is preferably within a range of from 1:0.1 to 1:1.0. The ratio between the thickness of the second coating layer 24 and the thickness of the third coating layer 26 is preferably within a range of from 1:1.0 to 1:10. The total of thicknesses of the first, second and third coating layers 22, 24, 26 is preferably within a range of from 1.1 μm to 10 μm. Examples 1-26 of FIG. 4 all satisfy these conditions regarding the thickness of each of the coating layers 22, 24, 26. In Examples 27-29 of FIG. 5, the thickness of the first coating layer 22 is smaller than 1.0 μm. In Example 28 of FIG. 5, the ratio of the thickness of the third coating layer 26 to the thickness of the second coating layer 24 is smaller than 1.0. In Example 30 of FIG. 5, the ratio of the sum of the thicknesses of the second and third coating layers 24, 26 to the thickness of the first coating layer 22 is larger than 1.0, while the ratio of the thickness of the third coating layer 26 to the thickness of the second coating layer 24 is larger than 20. In Example 31 of FIG. 5, the ratio of the sum of the thicknesses of the second and third coating layers 24, 26 to the thickness of the first coating layer 22 is smaller than 0.1. In Example 32 of FIG. 5, the thickness of the first coating layer 22 is larger than 5.0 μm. In Example 33 of FIG. 5, the thickness of the first coating layer 22 is larger than 5.0 μm, while the total of thicknesses of the first, second and third coating layers 22, 24, 26 is larger than 10 μm.

In FIGS. 4 and 5, "COATING COMPOSITION" represents sequentially the compositions of the first, second and third coating layers 22, 24, 26, with "+" being interposed therebetween. "1:(2+3) THICKNESS RATIO" represents the ratio between the thickness of the first coating layer 22 and the sum of thicknesses of the second and third coating layers 24, 26. "2:3 THICKNESS RATIO" represents the ratio between the thickness of the second coating layer 24 and the thicknesses of the third coating layer 26.

Figure 2:
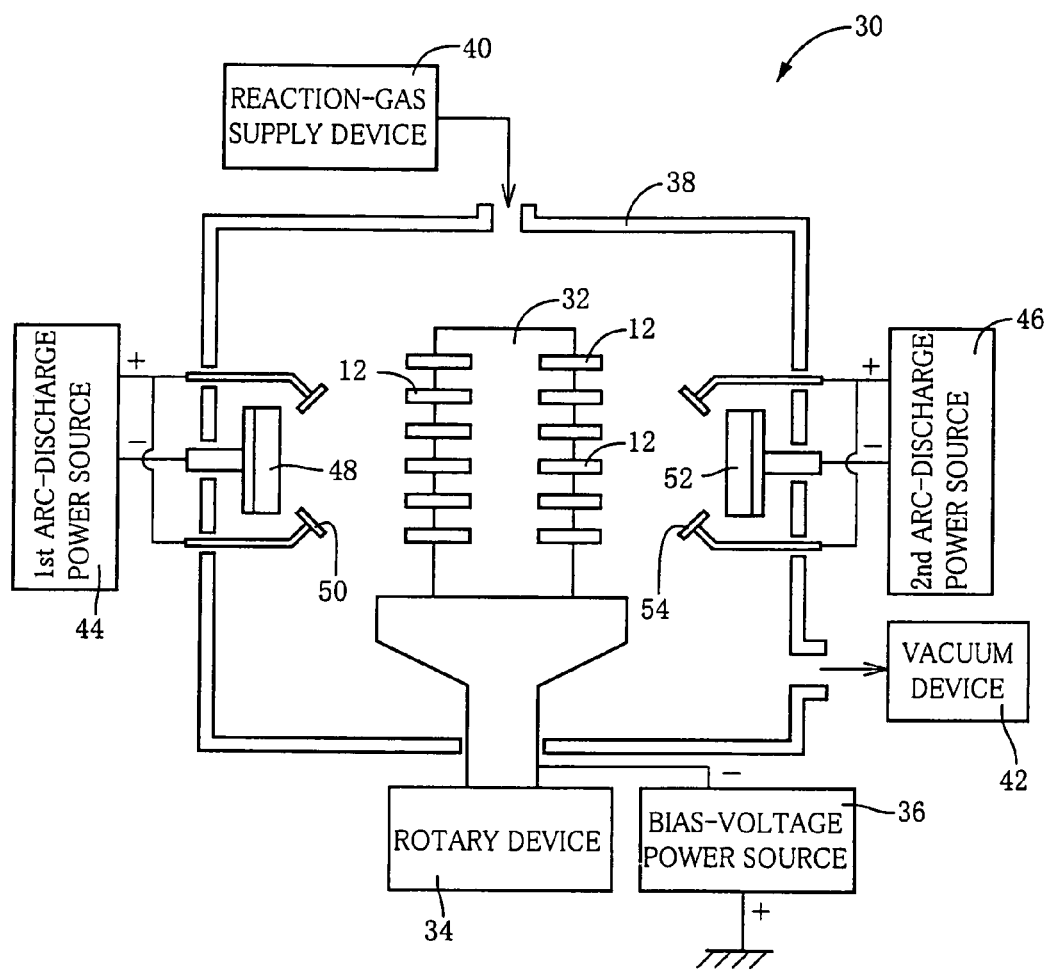
FIG. 2 is a view schematically showing, by way of example, an arc-type ion plating apparatus which can be advantageously used for forming the hard multilayer coating shown in FIG. 1B.

FIG. 2 is a view schematically showing, by way of example, an arc-type ion plating apparatus 30 which can be advantageously used for forming the hard multilayer coating 20. The arc-type ion plating apparatus 30 includes: a holding member 32 for holding a multiplicity of intermediate products in the form of the substrates 12 each of which is not yet coated with the hard multilayer coating 20 and has the peripheral and end cutting edges 16, 18 already formed therein; a rotary device 34 for rotating the holding member 32 about a rotation axis which extends substantially in a vertical direction; a bias-voltage power source 36 for applying a negative bias voltage to the substrates 12; a processing vessel in the form of a chamber 38 which accommodates therein the substrates 12; first and second arc-discharge power sources 44, 46; a reaction-gas supplying device 40 for supplying a reaction gas into the chamber 38; and a vacuum device 42 for sucking a gas in the interior of the reactor 22 with, for example, a vacuum pump so as to reduce the pressure in the interior of the chamber 38. The holding member 32 consists of a cylindrical or prism member having a center at the above-described rotation axis. The multiplicity of substrates 12 are held by the holding member 32 such that each substrate 12 takes a substantially horizontal posture with the cutting teeth portion 14 protruding outwardly in a radial direction of the holding member 32. The reaction-gas supplying device 40 is equipped with tanks in which nitrogen gas ($N_2$), hydrocarbon gas ($CH_4$, $C_2H_2$, etc.) and oxygen gas ($O_2$) are respectively stored. The reaction-gas supplying device 40 is adapted to be activated in accordance with a desired composition of each of the first, second and third coating layers 22, 24, 26. That is, the reaction-gas supplying device 40 supplies only the nitrogen gas from the corresponding tank, where the desired composition is nitrogen. The device 40 supplies the nitrogen gas and the hydrocarbon gas from the respective tanks in accordance with the mixed crystal ratios a, b, c, d, where the desired composition is carbon nitrogen. The device 40 supplies the nitrogen gas and the oxygen gas from the respective tanks in accordance with the mixed crystal ratios a, b, c, d, where the desired composition is oxide nitrogen.

The first arc-discharge power source 44 is connected to an evaporation source in the form of a first cathode 48 which is formed of TiAlCr corresponding to the component of the first and second coating layers 22, 24, and also to a first anode 50. The first arc-discharge power source 44 serves to supply a predetermined amount of an arc current between the first cathode 48 and the first anode 50, for causing arc discharge therebetween, so that TiAlCr is evaporated from the first cathode 48. The evaporated TiAlCr becomes metallic ions (positive ions), and then adheres to the substrates 12 to which the negative bias voltage is applied by the bias-voltage power source 36. Similarly, the second arc-discharge power source 46 is connected to another evaporation source in the form of a second cathode 52 which is formed of TiAl(SiC) corresponding to the component of the second and third coating layers 24, 26, and also to a second anode 54. The second arc-discharge power source 46 serves to supply a predetermined amount of an arc current between the second cathode 52 and the second anode 54, for causing arc discharge therebetween, so that TiAl(SiC) is evaporated from the second cathode 52. The evaporated TiAl(SiC) becomes metallic ions (positive ions), and then adheres to the substrates 12 to which the negative bias voltage is applied by the bias-voltage power source 36.

Figure 3:
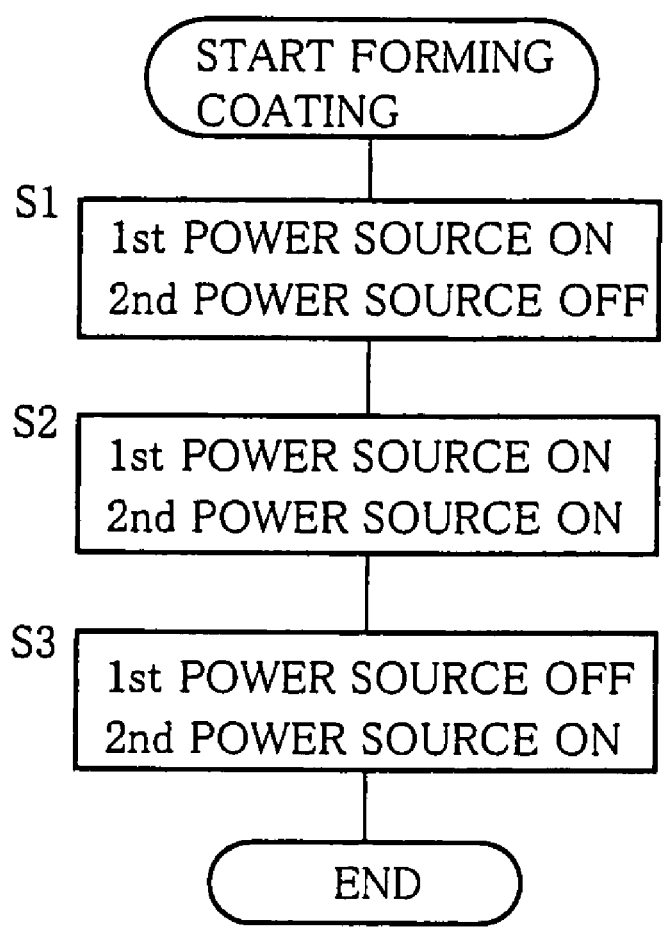
FIG. 3 is a flow chart illustrating a procedure for forming the hard multilayer coating by using the apparatus of FIG. 2.

FIG. 3 is a flow chart illustrating a procedure for forming the hard multilayer coating 20 on a surface of the cutting teeth portion 14 of the substrate 12, by using the arc-type ion plating apparatus 30. Prior to the implementations of steps S1-S3, the pressure in the interior of the chamber 38 is held in a predetermined value (which ranges, for example, from $1.33 \times 5 \times 10^{-1}$ Pa to $1.33 \times 40 \times 10^{-1}$ Pa) by the reaction-gas supplying device 40 and the vacuum device 42, while a predetermined value of the negative bias voltage (which ranges, for example, from −50V to −150V) is applied to the substrates 12 by the bias-voltage power source 36. In this instance, the vacuum device 42 vacuums the chamber 30, and at the same time the reaction-gas supplying device 40 supplies the reaction gas into the chamber 30 in such a manner that holds the pressure in the interior of the chamber 30 in the above-described predetermined value. The steps S1-S3 are then implemented with the rotary device 34 being activated to rotate the holding member 32 at a predetermined number of revolutions (for example, 3 $min^{-1}$), so that the hard multilayer coating 20 is formed on the substrate 12. Such a formation of the hard multilayer coating 20 is carried out under control of a control device including a computer.

In the step S1, while the second arc-discharge power source 46 is kept OFF, the first arc-discharge power source 44 is kept ON so as to supply the arc current between the first cathode 48 and the first anode 50 for thereby causing only the first cathode 48 to be evaporated, so that the first coating layer 22 essentially consisting of $TiAlCrX_{1-a}N_a$ and having a predetermined thickness is formed on the substrate 12. The value of the arc current supplied by the first arc-discharge power source 44 and the power-on time for which the first arc-discharge power source 44 is kept ON are determined based on the desired thickness of the first coating layer 22.

The step S1 is followed by the step S2 that is implemented to form the mixture layer essentially consisting of $TiAlCrX_{1-b}N_b$ and $TiAl(SiC)X_{1-c}N_c$ (wherein the mixed crystal ratios b, c are equal to each other). In the step S2, the first arc-discharge power source 44 is kept ON so as to supply the arc current between the first cathode 48 and the first anode 50 for thereby causing arc discharge therebetween, while at the same time the second arc-discharge power source 46 is kept ON so as to supply the arc current between the second cathode 52 and the second anode 54 for thereby causing arc discharge therebetween, so that the second coating layer 24 essentially consisting of $TiAlCrX_{1-b}N_b$ and $TiAl(SiC)X_{1-c}N_c$ and having a predetermined thickness is formed on the first coating layer 22. The values of the arc currents supplied by the respective first and second arc-discharge power sources 44, 46 are determined based on the desired proportions of $TiAlCrX_{1-b}N_b$ and $TiAl(SiC)X_{1-c}N_c$ and the desired thickness of the second coating layer 24. In the present embodiment (i.e., the above-described Examples 1-3), the values of the supplied arc currents are determined to be substantially equal to each other such that the mixture ratio therebetween is substantially 1:1, while the power-on times of the first and second arc-discharge power sources 44, 46 are determined based on the desired thickness of the second coating layer 24.

Where the multilayer consisting of the above-described first and second sublayers alternately superposed on each other is formed as the second coating layer 24, the step S2 is implemented such that the first and second arc-discharge power sources 44, 46 are alternately turned ON, whereby the first and second cathodes 48, 52 are alternately evaporated. In this instance, the power-on times of the first and second arc-discharge power sources 44, 46 are determined based on the desired thickness of each of the first and second sublayers.

The procedure for forming the hard multilayer coating 20 is completed by the step S3 in which while the first arc-discharge power source 44 is kept OFF, the second arc-discharge power source 46 is kept ON so as to supply the arc current between the second cathode 52 and the second anode 54 for thereby causing only the second cathode 52 to be evaporated, so that the third coating layer 26 essentially consisting of $TiAl(SiC)X_{1-d}N_d$ and having a predetermined thickness is formed on the second coating layer 24. The value of the arc current supplied by the second arc-discharge power source 46 and the power-on time for which the second arc-discharge power source 46 is kept ON are determined based on the desired thickness of the third coating layer 26.

In the hard multilayer coating 20 constructed as described, $TiAl(SiC)X_{1-d}N_d$ constituting the uppermost or outermost third coating layer 26 is excellent in its heat resistance owing to its oxidation initiation temperature that is sufficiently high, $TiAlCrX_{1-a}N_a$ constituting the first coating layer 22 has a coating hardness that is sufficiently high, and the second coating layer 24 provided by the mixture layer or by the multilayer contains substantially the same components as the first and third coating layers 22, 26 is disposed between the first and third coating layers 22, 26. This construction provides a high degree of adhesiveness among the first, second and third coating layers 22, 24, 26, so that the first, second and third coating layers 22, 24, 26 as a whole is provided with excellent heat resistance and wear resistance. Therefore, the end mill 10 as the hard multilayer coated tool having the substrate 12 covered at its surface with such the hard multilayer coating 20 is capable of cutting or machining a high hardness material at a high speed, owing to the improved heat resistance and wear resistance.

In Examples 1-26 of FIG. 4, the thickness of the first coating layer 22 is not smaller than 1.0 μm and not larger than 5.0 μm, the ratio of the sum of thicknesses of the second and third coating layers 24, 26 to the thickness of the first coating layer 22 is not smaller than 0.1 and not larger than 1.0, and the total of thicknesses of the first, second and third coating layers 22, 24, 26 is not smaller than 1.1 μm and not larger than 10 μm. In this arrangement, deformation of the coating 20 as a whole is restrained owing to presence of the first coating layer 22 having a relatively high degree of hardness, and chipping and peeling of the coating 20 is satisfactorily prevented owing to further increased adhesiveness of the third coating layer 26. Further, since the thickness of the third coating layer 26 is larger than the thickness of the second coating layer 24, the hard multilayer coating 20 as a whole is given the heat resistance which is increased by the presence of the third coating layer 26.

In Examples 1-15 and 21 of FIG. 4 and Examples 27-33 of FIG. 5, the mixed crystal ratios a, b, c, d are all the same to each other. This arrangement, where the hard multilayer coating 20 is formed by the arc-type ion plating apparatus 30, eliminates necessity of switching the reaction gas during the formation of the coating 20, thereby facilitating the manufacturing of the coating 20, and making it possible to reliably obtain the coating 20 with the predetermined mixed crystal ratios.

Cutting tests were conducted by using, as Examples 1-33 of FIGS. 4 and 5 and Comparative Examples 1-16 of FIG. 6, a total of forty-nine square end mills each having six teeth and a diameter of 10 mm. The substrates of the these end mills are made of cemented carbide, and are coated with respective coatings different from each other, as indicated in FIGS. 4-6. Comparative Example 1 is different from Examples 1-33 of the present invention in that the coating is provided by two layers without a layer equivalent to the third coating layer 26 essentially consisting of TiAl(SiC)CN. Comparative Example 2 is different from Examples 1-33 in that the third coating layer as well as the first coating layer consists of TiAlCrN. Comparative Examples 3-16 are different from Examples 1-33 of the present invention in that the coating is provided by a single layer rather than a multilayer. In the tests, after a workpiece had been cut at its side surface by each of the end mills over a distance of 28 m under a cutting condition as specified below, a flank wear width VB (mm) was measured in each peripheral flank face. The results of the tests are indicated in the rightmost column of each of tables of FIGS. 4-6.

[Cutting Condition]
Workpiece: SKD11 (60HRC)
Peripheral cutting velocity (Number of revolutions): 120 m/min (3820 $min^{-1}$)
Feed rate: 1850 mm/min (0.08 mm/tooth)
Depth of cut: RD (Radial depth)=0.5 mm
  AD (Axial depth)=10 mm
Cutting fluid: Dry cutting with application of air blow As is apparent from the results of the cutting tests indicated in FIGS. 4-6, the width VB of wear in the peripheral flank face in each of Examples 1-26 of the present invention was as small as 0.07-0.09 mm. Thus, Examples 1-26 exhibited remarkably improved wear resistance, as compared with Comparative Examples 3-16 in each of which the hard coating is provided by the single layer consisting of TiAlN, TiAl(SiC)N or TiAlCrN. Further, the wear resistance of Examples 1-26 was more excellent than also Comparative Example 1 (in which the mixture layer of TiAlCrCN and TiAl(SiC)CN constitutes the outermost layer in absence of a layer equivalent to the third coating layer 26) and Comparative Example 2 (in which the third coating layer as well as the first coating layer consists of TiAlCrN). Thus, the tests revealed that the heat resistance and the wear resistance of the hard coating was further improved by the provision of the outermost layer in the form of the third coating layer 26 essentially consisting of $TiAl(SiC)X_{1-d}N_d$.

The width VB of wear in the peripheral flank face in each of Examples 27-33 of FIG. 5 of the present invention was about 0.1 mm, and was not so small as that in each of Examples 1-26 of FIG. 4 of the present invention. However, the wear resistance of the Examples 27-33 was remarkably improved as compared with Comparative Examples 3-16 in each hard coating is provided by the single layer consisting of TiAlN, TiAl(SiC)N or TiAlCrN.

While the presently preferred embodiment of the present invention has been illustrated above, it is to be understood that the invention is not limited to the details of the illustrated embodiment, but may be embodied with various other changes, modifications and improvements, which may occur to those skilled in the art, without departing from the spirit and scope of the invention defined in the following claims.

What is claimed is:

1. A hard multilayer coating that is to be disposed on a body, comprising:
   a first coating layer disposed to be held in contact with the body, said first coating layer essentially consisting of $TiAlCrX_{1-a}N_a$ (wherein "X" represents one of carbon and oxygen, and "a" represents a mixed crystal ratio satisfying $0.5 \leq a \leq 1$);
   a second coating layer disposed on said first coating layer and provided by a mixture layer essentially consisting of $TiAlCrX_{1-b}N_b$ (wherein "X" represents said one of carbon and oxygen, and "b" represents a mixed crystal ratio satisfying $0.5 \leq b \leq 1$) and $TiAl(SiC)X_{1-c}N_c$ (wherein "X" represents said one of carbon and oxygen, and "c" represents a mixed crystal ratio satisfying $0.5 \leq c \leq 1$); and
   a third coating layer disposed on said second coating layer and constituting an outermost layer of said hard multilayer coating, said third coating layer essentially consisting of $TiAl(SiC)X_{1-d}N_d$ (wherein "X" represents said one of carbon and oxygen, and "d" represents a mixed crystal ratio satisfying $0.5 \leq d \leq 1$).

2. The hard multilayer coating according to claim 1, wherein said first coating layer has a thickness of from 1.0 µm to 5.0 µm,
   wherein a ratio of a sum of thicknesses of said second and third coating layers to said thickness of said first coating layer is from 0.1 to 1.0,
   and wherein a total of thicknesses of said first, second and third coating layers is from 1.1 µm to 10 µm.

3. The hard multilayer coating according to claim 2, wherein a ratio of said thickness of said third coating layer to said thickness of said second coating layer is from 1.0 to 20.

4. The hard multilayer coating according to claim 1, wherein said mixed crystal ratios a, b, c, d are all the same to each other.

5. A hard multilayer coated tool comprising:
   the hard multilayer coating defined in claim 1; and
   a substrate as said body having a surface coated with said hard multilayer coating.

6. A hard multilayer coating that is to be disposed on a body, comprising:
   a first coating layer disposed to be held in contact with the body, said first coating layer essentially consisting of $TiAlCrX_{1-a}N_a$ (wherein "X" represents one of carbon and oxygen, and "a" represents a mixed crystal ratio satisfying $0.5 \leq a \leq 1$);
   a second coating layer disposed on said first coating layer and provided by a multilayer including a first sublayer essentially consisting of $TiAlCrX_{1-b}N_b$ (wherein "X" represents said one of carbon and oxygen, and "b" represents a mixed crystal ratio satisfying $0.5 \leq b \leq 1$) and a second sublayer essentially consisting of $TiAl(SiC)X_{1-c}N_c$ (wherein "X" represents said one of carbon and oxygen, and "c" represents a mixed crystal ratio satisfying $0.5 \leq c \leq 1$), said first and second sublayers being alternately superposed on each other; and
   a third coating layer disposed on said second coating layer and constituting an outermost layer of said hard multilayer coating, said third coating layer essentially consisting of $TiAl(SiC)X_{1-d}N_d$ (wherein "X" represents said one of carbon and oxygen, and "d" represents a mixed crystal ratio satisfying $0.5 \leq d \leq 1$).

7. The hard multilayer coating according to claim 6,
   wherein said first coating layer has a thickness of from 1.0 µm to 5.0 µm,
   wherein a ratio of a sum of thicknesses of said second and third coating layers to said thickness of said first coating layer is from 0.1 to 1.0,
   and wherein a total of thicknesses of said first, second and third coating layers is from 1.1 µm to 10 µm.

8. The hard multilayer coating according to claim 7, wherein a ratio of said thickness of said third coating layer to said thickness of said second coating layer is from 1.0 to 20.

9. The hard multilayer coating according to claim 6, wherein said mixed crystal ratios a, b, c, d are all the same to each other.

10. A hard multilayer coated tool comprising:
    the hard multilayer coating defined in claim 6; and
    a substrate as said body having a surface coated with said hard multilayer coating.

* * * * *